(12) United States Patent
Weng

(10) Patent No.: US 6,877,342 B2
(45) Date of Patent: Apr. 12, 2005

(54) CONTROLLED METHOD FOR THE ENERGY-SAVING AND ENERGY-RELEASING REFRIGERATING AIR CONDITIONER

(75) Inventor: Kuo-Liang Weng, Taichung Hsien (TW)

(73) Assignee: Cohand Technology Co., Ltd., Taichung Hsien (TW)

( * ) Notice: Subject to any disclaimer, the term of this patent is extended or adjusted under 35 U.S.C. 154(b) by 0 days.

(21) Appl. No.: 10/611,888

(22) Filed: Jul. 3, 2003

(65) Prior Publication Data

US 2005/0000236 A1 Jan. 6, 2005

(51) Int. Cl.⁷ .............................................. F25D 3/00
(52) U.S. Cl. .............................. 65/59; 62/118; 62/129; 62/159; 62/217
(58) Field of Search .......................... 62/59, 117, 118, 62/129, 159, 201, 213, 217

(56) References Cited

U.S. PATENT DOCUMENTS

| | | | | |
|---|---|---|---|---|
| 4,732,007 A | * | 3/1988 | Dolan et al. | 62/79 |
| 5,467,812 A | * | 11/1995 | Dean et al. | 165/62 |
| 5,678,626 A | * | 10/1997 | Gilles | 165/62 |
| 5,682,752 A | * | 11/1997 | Dean | 62/59 |
| 5,871,041 A | * | 2/1999 | Rafalovich et al. | 165/10 |
| 6,557,361 B1 | * | 5/2003 | Howard | 62/175 |
| 2001/0023594 A1 | * | 9/2001 | Ives | 62/335 |

FOREIGN PATENT DOCUMENTS

| | | | | |
|---|---|---|---|---|
| JP | 02002106890 A | * | 4/2002 | |
| JP | 02003161567 A | * | 6/2003 | |

* cited by examiner

*Primary Examiner*—William E. Tapolcai
*Assistant Examiner*—Mohammad M. Ali
(74) *Attorney, Agent, or Firm*—Troxell Law Office, PLLC

(57) ABSTRACT

A controlled method for an energy-saving and energy-releasing air conditioning discloses the energy-saving and energy-releasing actions performed by the two adjoined heat exchangers of the storage means. The feature of this design is to meet refrigerating and heat-produced requirements by using the controlled method of the present invention. Automatically adjusting the refrigerant flow rates of the first and the second circular refrigerant loops can place it into the optimum operational condition while central air conditioner is either under high loading or under low loading condition.

2 Claims, 5 Drawing Sheets

CONTROLLED METHOD FOR THE ENERGY-SAVING AND ENERGY-RELEASING REFRIGERATING AIR CONDITIONER

BACKGROUND OF THE INVENTION

1. Field of the Invention

The present invention relates to a controlled method for an energy-saving and energy-releasing air conditioning system. The energy-saving and energy-releasing actions are performed by the two adjoined heat exchangers of the storage means. The feature of this design is to meet refrigerating and heat-produced requirements by using the controlled method of the present invention. Automatically adjusting the refrigerant flow rates of the first and the second circular refrigerant loops can place it into the optimum operational condition while central air conditioner is either under high loading or under low loading condition.

2. Description of the Related Art

According to the general central air conditioner's operation capacity (compressor and heating system) and following to the design rule of which QL (the environmental loading during peak period)<Qe (the cooling-produced ability of evaporator)<Qc (compressor and heating systems' abilities), the central air conditioner (compressor and heating system) can surely provide enough operation capacity for the refrigerating air conditioning system during peak loading. However, the peak period is a small portion of the whole operation. Therefore, the operational control of central air conditioner (compressor and heating system) situates in a huge energy-releasing condition for long-term, which causes energy waste. Moreover, the operational control of general central air conditioner (compressor and heating system) uses on/off to control energy supply. However, the actions of on and off cause central air conditioner on and off frequently and which decrease the central air conditioner's life cycle. As a result, the various-speed controlling mode is the latest method to actuate the central air conditioner to perform partial loading operation, which use frequency converter to control frequency and to keep the total refrigerant flow rate of central air conditioner (compressor and heating system) in a certain range during under various loadings. The central air conditioner is under low loading operation in long-term performance, and which can cause energy waste. Moreover, oil-return problem in partial loading operations will increasingly damage mechanical components and causes serious break-up and damage.

In order to overcome the shortage of over-operations in prior central air conditioners, the present invention is completed by multiple improvements. The energy-saving and energy-releasing actions are performed by the two heat exchangers of the storage means as shown in the present invention. Automatically adjusting the refrigerant flow rates of the first and the second circular refrigerant loops can place air conditioner into the optimum operational condition while central air conditioner is either under high loading or under low loading condition. This invention can achieve energy-saving purpose and efficiently solve the shortage of the prior art.

SUMMARY OF THE INVENTION

It is an object of the present invention to provide a controlled method for an energy-saving and energy-releasing refrigerating air conditioning system. In order to meet the refrigerating and heating-produced requirements, automatically adjusting the refrigerant flow rates of the first and the second circular refrigerant loops can place central air conditioner into the optimum operational condition while central air conditioner is either under high loading or under low loading condition. This design can achieve energy-saving purpose.

It is to be understood that both the foregoing general description and the following detailed description are exemplary, and are intended to provide further explanation of the invention as claimed.

BRIEF DESCRIPTION OF THE DRAWINGS

The accompanying drawing is included to provide a further understanding of the invention, and is incorporated in and constitutes a part of this specification. The drawing illustrates an embodiment of the invention and, together with the description, serves to explain the principles of the invention. In the drawing.

DETAILED DESCRIPTION OF THE PREFERRED EMBODIMENTS

Figure 1:
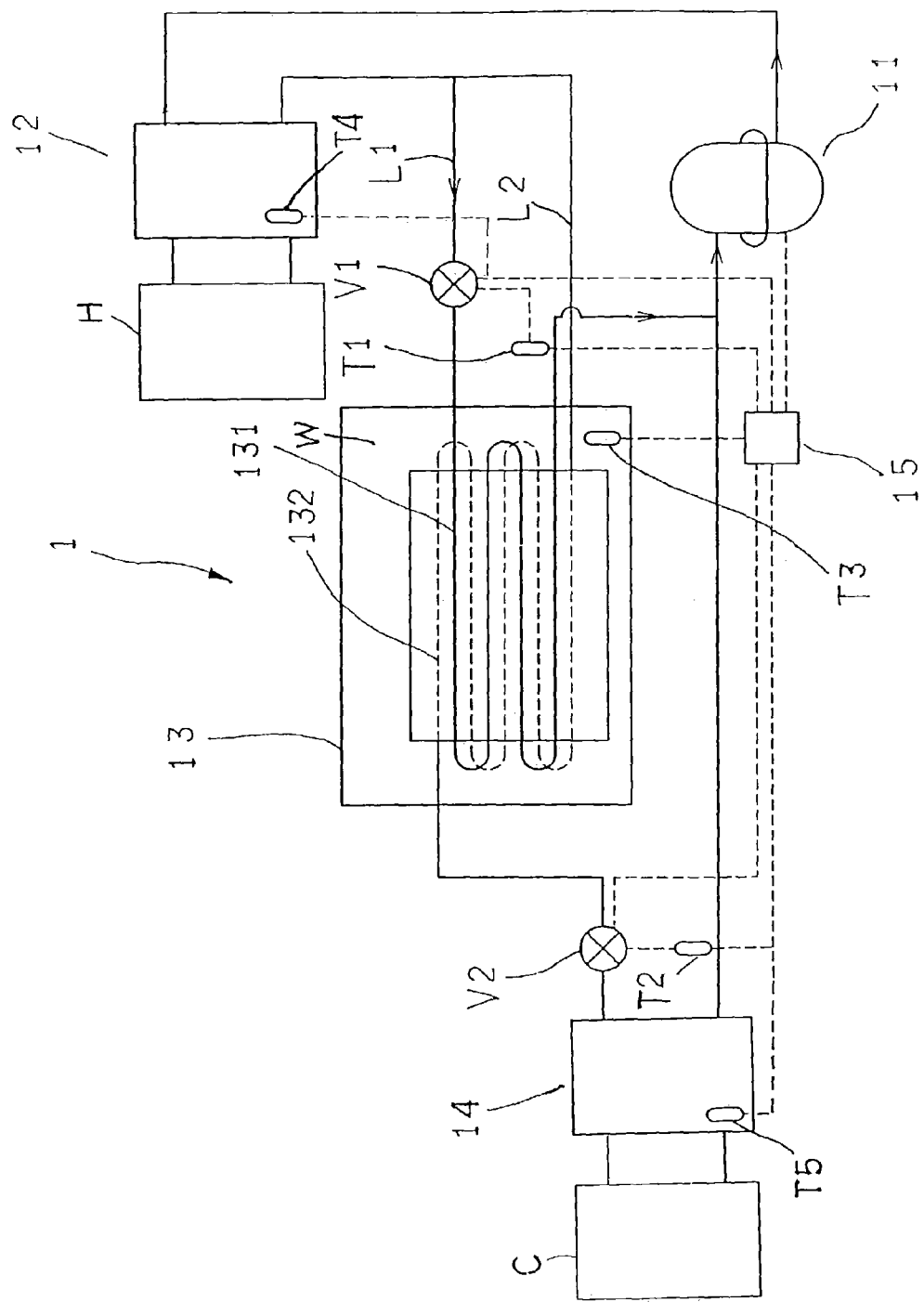
FIG. 1 is the preferred embodiment of the present invention showing the system of the first refrigerant circular loop.

Reference will now be made in detail to the preferred embodiments of the present invention, examples of which are illustrated in the accompanying drawings. Wherever possible, the same reference numbers are used in the drawings and the description to refer to the same or like parts.

Figure 2:
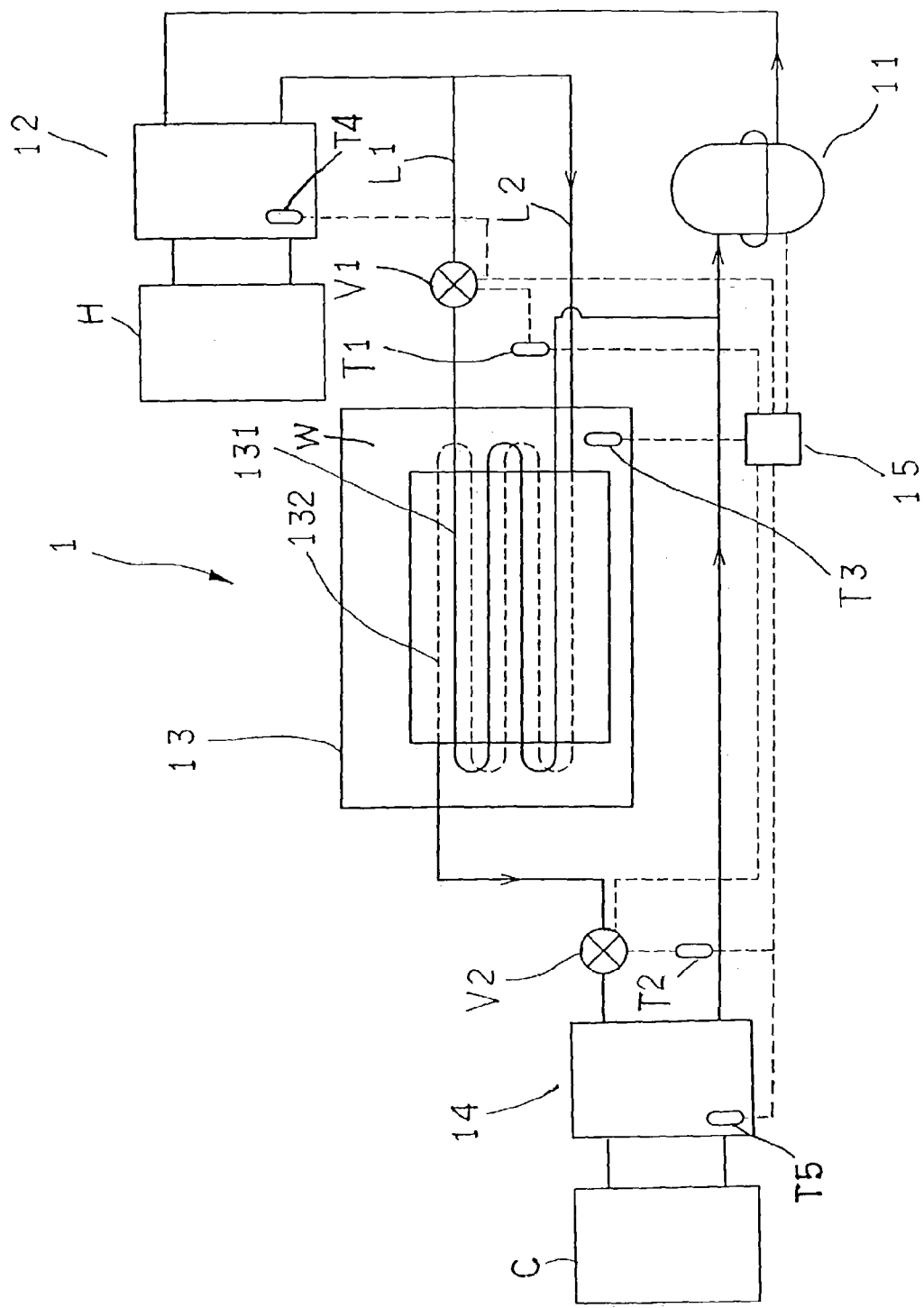
FIG. 2 is the preferred embodiment of the present invention showing the system of the second refrigerant circular loop operation.

FIG. 1 and FIG. 2 are the preferred embodiments of the present invention showing a refrigerating air conditioning system, which comprises one central air conditioner (11) at least, one heating-produced machine (12), one storage means (13), and one refrigerating machine (14) and one controller (15). Besides, the first refrigerant circular loop (L1) and the second refrigerant circular loop (L2) are also included in the system for connecting to the above components, in which;

The first refrigerant circular loop (L1) performs circulation through the central air conditioner (11), the heating-produced machine (12, the refrigerant in the system is acting cooling process here), the first refrigerant flow controller (V1, the first temperature sensor T1 is set here to measure the first refrigerant back-flow temperature (TA1), and the first heat exchanger (131) of the storage means (13) in order. Finally, it will return to the central air conditioner (11) for constructing a circular loop.

The second refrigerant circular loop (L2) performs circulation through the central air conditioner (11), the heating-produced machine (12, the refrigerant in the system is acting cooling process here), the second refrigerant flow controller (V2, the second temperature sensor T2 is set here to measure the second refrigerant back-flow temperature TA2), and the refrigerating machine (14, the refrigerant in the system is acting steam absorption) in order. Finally, it will return to the central air conditioner (11) for constructing a circular loop.

The storage means (13) comprises with a phase-changeable cooling medium (W) (such as water and glycol liquid), the first heat exchanger (131), and the second heat exchanger (132), and the third temperature sensor (T3, which is to detect the temperature Ti of the storage means 13). Both of the heat exchangers (131 and 132) are adjoined but cannot penetrate. The first heat exchanger (131) is one section of the first refrigerant circulation loop (L1), and the second heat exchanger (132) is one section of the $2^{nd}$ refrigerant circular loop (L2). The refrigerant circular loop, and the first and the second refrigerant flow controllers (V1 and V2) control the refrigerant flow rates (m1 and m2), and the refrigerant temperature difference (temperature range) between heating exchangers makes one of the heat exchanger perform energy-releasing action (cooling releasing or heating-releasing) and the other heat exchanger performs energy-saving action (cooling-saving or heating-saving).

The heating produced machine (12) comprises with the forth temperature sensor (T4) for detecting heating-produced temperature Th of the heating-produced machine. This can control the heat supply of a heat-required system H while cooling-produced requirement is greater than heating-produced requirement, and also the extra heat can be removed. Similarly, the refrigerating machine (14) comprises with the fifth temperature sensor (T5) and which can detect refrigerating temperature (Tc) of the refrigerating machine (14) for controlling cooling supply in required-cooling system (C). Besides, the required-cooling system is with heat-absorption capacity while the heating-produced requirement is greater than refrigerating requirement.

By comprising above components, the controller (15) measures the temperatures (TA1, TA2, Ti, Th, Tc) from each temperature sensor (T1, T2, T3, T4, and T5), and the results are compared with the setting temperatures (TAS1, TAS2, Tics, Tihs, Ths, Tcs). The first and the $2^{nd}$ refrigerant flow controllers (V1 and V2) control the temperature flow rates (m1 and m2), and which can make refrigerant do well adjustment in circular loop according to different loadings while meeting refrigerating or heating-produced requirements. The relationship can be seen as the following;

1. The refrigerant flow rate m (a fixed value), the required refrigerant flow rate (m1) of the $1^{st}$ refrigerant circular loop (L1), and the required refrigerant flow rate (m2) of the $2^{nd}$ refrigerant circular loop (L2) have the following relationship, which is m=m1+m2. Because of the refrigerant flow rate is fixed, m2 is smaller while m1 is greater, and vice versa.

2. The refrigerating flow rate m1 (m2) of the first (the second) refrigerant circular loop L1 (L2) is controlled by the $1^{st}$ (the second) refrigerant flow controller V1 (V2) measures the first (the second) refrigerant back-flow temperature TA1 (TA2) of the first (the second) temperature sensor T1 (T2), and then performs a comparison to with setting temperature TAS1 (TAS2) to control its flow rate.

Figure 3:
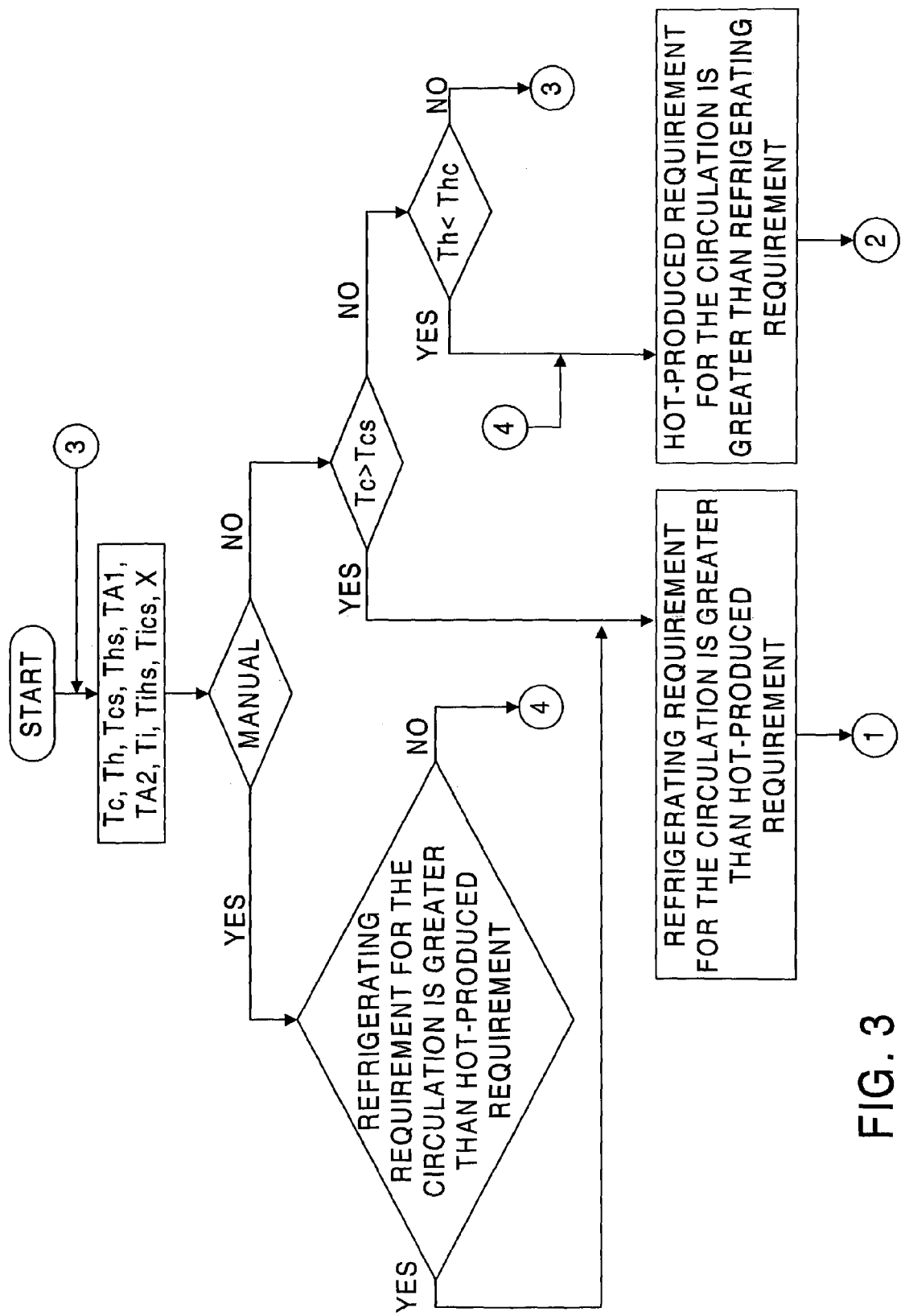
FIG. 3 is the controlled flow chart 1 of the present invention.

Manual operation or automatic control is to meet different requirements of refrigerating and heat-produced needs in the whole operation of the refrigerating air conditioning system, the controlled method of the refrigerant circular loop can refer to FIG. 3.

Figure 4:
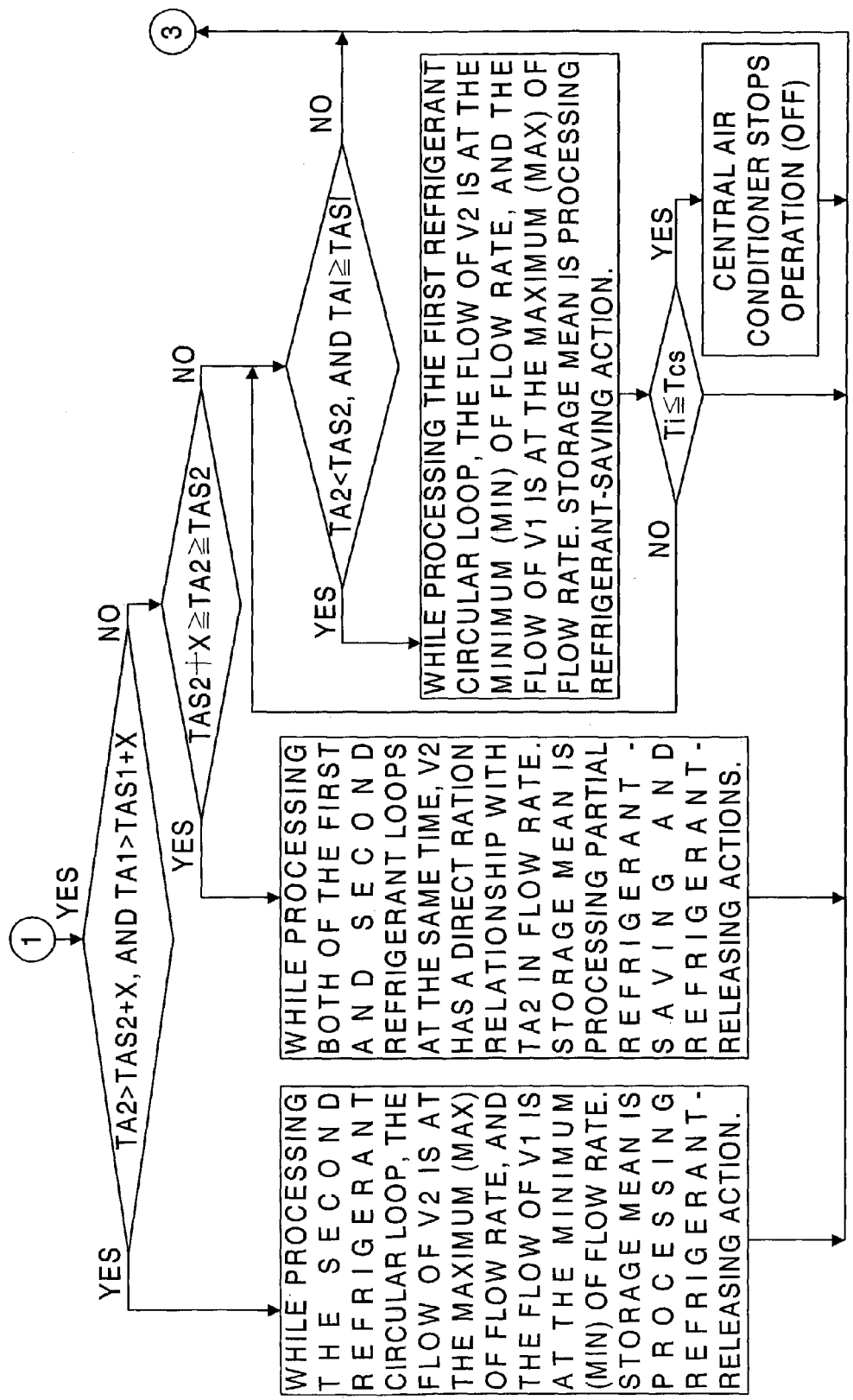
FIG. 4 is the controlled flow chart 2 of the present invention.

1. While cooling-produced requirement is greater than heating-produced requirement and the refrigerating temperature Tc is greater than setting cooling-produced temperature Tcs (which is Tc≦Tcs), the refrigerating air conditioning system forces it to perform refrigerating circulation. The steps of the controlled method as the following (please referring to FIG. 3 and FIG. 4);

(1) In the cases where the second refrigerant back-flow temperature (TA2) is greater than the $2^{nd}$ setting temperature (TAS2) with pulsing setting temperature range (X). and where the first refrigerant back-flow temperature (TA1) is greater than the first setting temperature (TAS1) with pulsing setting temperature range X (TA2>TAS2+X and TA1>TAS1+X), the refrigerating air conditioning system (1) automatically chooses the second refrigerant circular loop (L2) as circulation. In the meanstime, the second refrigerant flow controller (V2) is opened. The flow rate of m2 is at maximum flow rate but the flow rate (m2) of the first refrigerant flow controller (V2) is at the minimum flow rate. The storage means (13) is performing heating-releasing action.

(2) In the cases where the second refrigerant back-flow temperature (TA2) is less than or equal to the second setting temperature (TAS2) with plusing setting temperature range (X), and where the second refrigerant back-flow temperature (TA2) is greater than or equal to the second setting temperature (TAS2, which is TAS2+X≧TA2≧TAS2), the first and the second refrigerant circular loops are acting at the same time. The refrigerant flow rate (m2) of the second refrigerant flow controller (V2) has a direct ratio relationship to the second refrigerant back-flow temperature (TA2). While the second refrigerant back-flow temperature (TA2) is smaller, the refrigerant flow rate (m2) of the second refrigerant flow controller (V2) is smaller. Since the equation of m1=m-m2 in the system performs automatically adjustment, the refrigerant flow rate of first refrigerant flow controller (V1) is relatively great. The storage means (13) automatically performs cooling-saving and cooling-releasing actions, and it makes the cooling-releasing action to the cooling-saving action.

(3) In the cases where the second refrigerant back-flow temperature (TA2) is less than the second setting temperature (TAS2), and where the first refrigerant back-flow temperature (TA1) is greater than or equal to the first setting temperature (TAS1, which TA2<TAS2, and TA1≧TAS1), the refrigerating air conditioning system makes the cooling-releasing action to the cooling-saving action, and automatically chooses the first refrigerant circular loop (L1) as circulation. The refrigerant flow rate (m2) of the second refrigerant flow controller V2 is at the minimum flow rate here. However, the refrigerant flow rate (m1) of the first refrigerant flow controller V1 is at the maximum flow rate. The storage means (13) is performing cooling-saving action.

(4) While the temperature (Ti) of the storage means (13) is less than or equal to the setting temperature (Tics, and which Ti≧Tics), the central air conditioner (11) will be off operation, and complete cooling-saving operation.

Figure 5:
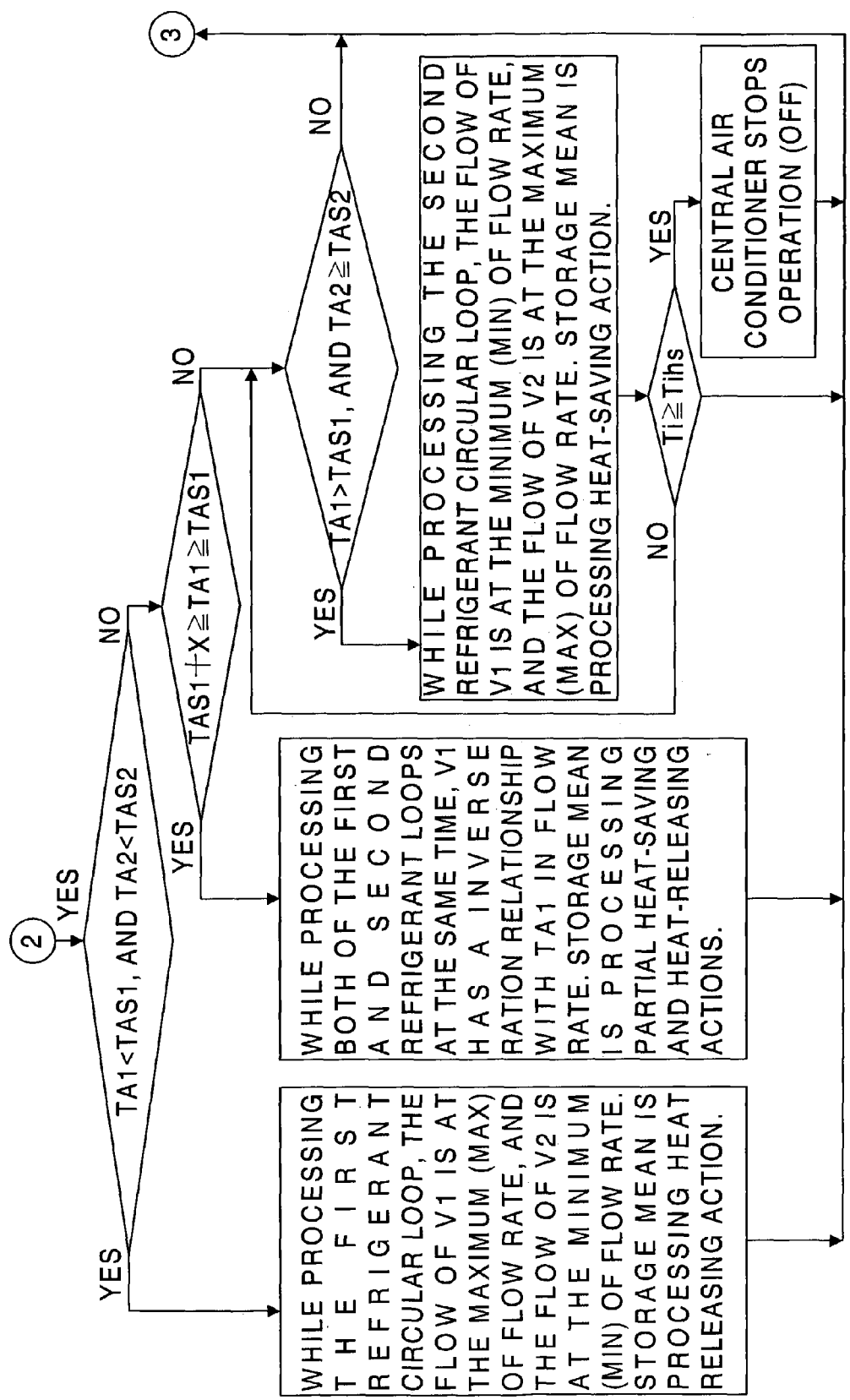
FIG. 5 is the controlled flow chart 3 of the present invention.

While heating-produced requirement is greater than refrigerant requirement and the heating-produced refrigerating temperature (The) is less than setting heating-produced temperature Ths (which is Tc≦Tcs), the refrigerating air conditioning system forces it to perform heating-produced circulation. The steps of the controlled method as following (please referring to FIG. 3 and FIG. 5);

(1) In the cases where the first refrigerant back-flow temperature (TA1) is less than the $2^{nd}$ setting temperature TAS2 (which is TA1<TAS1 and TA2<TAS2). The refrigerating air conditioning system (1) automatically chooses the first refrigerant circular loop (L1) as circulation. In the meanstime, the first refrigerant flow controller (V1) is opened. The flow rate of m1 is at maximum flow rate but the flow rate m2 of the $2^{nd}$ refrigerant flow controller (V2) is at the minimum flow rate. The storage means (13) is performing heating-releasing action.

(2) In the cases where the first refrigerant back-flow temperature (TA1) is less than or equal to the setting temperature (TAS1) with the setting temperature range (X), and where the first refrigerant back-flow temperature (TA1) is greater than or equal to the first setting temperature (TAS1, which is TAS1+X≧TA1≧TAS1), the $1^{st}$ and the $2^{nd}$ refrigerant circular loops (L1 and L2) are acting at the same time. The refrigerant flow rate (m1) of the first refrigerant flow controller (V1) has an inverse ratio relationship to the first refrigerant back-flow temperature (TA1). The first refrigerant back-flow temperature (TA1) is greater while the refrigerant flow rate (m1) of the first refrigerant flow controller (V1) is smaller. The equation of m2=m-m1 is for automatically adjusting refrigerant flow rate, and the refrigerant flow rate (m2) of the $2^{nd}$ refrigerant flow controller (V2) is relatively large. The storage means (13) automatically performs partial heating-saving and heating-releasing actions, which makes heating-releasing action to heating-saving action.

(3) In the cases where the first refrigerant back-flow temperature (TA1) is greater than the first setting temperature (TAS1) with adding setting temperature range (X), and where the second refrigerant back-flow temperature (TA2) is greater than or equal to the second setting temperature (TAS2, which TA1>TAS1+X, and TA2≧TAS2), the refrigerating air conditioning system makes the heating-releasing action to the heating-saving action, and automatically chooses the second refrigerant circular loop (L2) as circulation. The refrigerant flow rate (m1) of the first refrigerant flow controller V1 is at the minimum flow rate here. However, the refrigerant flow rate (m1) of the second refrigerant flow controller V2 is at the maximum flow rate. The storage means (13) is performing heating-saving action.

(4) While the temperature (Ti) of the storage means (13) is greater than or equal to the setting temperature (Tihs, and which Ti≧Tihs), the central air conditioner will be off operation, and complete heating-saving operation.

According to the above description, the present invention uses the storage means with the controlled method of the first and the second refrigerant circular loops to achieve energy-saving and energy-releasing actions. This invention can efficiently achieve energy-saving purpose.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A controlled method for an energy-saving and energy-releasing refrigerating air conditioner wherein a refrigerating requirement is greater than a heating requirement during circulation, and where a refrigerating temperature is greater than a setting refrigerating temperature, an energy-saving and energy-releasing refrigerating air conditioning system forces performing refrigerating circulation, which the method comprising the steps of:

(1) in cases where a 2nd refrigerant back-flow temperature is greater than a 2nd setting temperature with adding setting temperature range, and where a first refrigerant back-flow temperature is greater than a first setting temperature with adding setting temperature range, the refrigerating air conditioning system automatically chooses a 2nd refrigerant circular loop as circulation, and 2nd refrigerant flow controllers therefore are all opened, and a refrigerant flow rate is at a maximum flow rate, a flow of a first refrigerant flow controller is at a minimum flow rate, and a storage means is performing a cool-releasing action;

(2) in the cases where the 2nd refrigerant back-flow temperature is less than or equal to the 2nd setting temperature with adding setting temperature range, and where the second refrigerant back-flow temperature is greater than or equal to the second setting temperature, the first and the second refrigerant circular loops are acting at the same time, and the refrigerant flow rate of the second refrigerant flow controller is a direct ratio to the second refrigerant back-flow temperature, as a result, the refrigerant flow rate is automatically adjusted and increases the refrigerant flow rate of the first refrigerant flow controller, the storage means performing a cool-saving action and the cool-releasing action, and making the cool-releasing action into the cooling-saving action;

(3) in the cases where the 2nd refrigerant back-flow temperature is less than the 2nd setting temperature, and where the first refrigerant back-flow temperature is greater than or equal to the first setting temperature, the refrigerating air conditioning system automatically chooses the first refrigerant circular loop as circulation, and the flow of 2nd refrigerant flow controllers in the means time is at a minimum flow rate, the flow of the first refrigerant flow controller is at a maximum flow rate, and the storage means is performing the cool-saving action; and (4) while the temperature of storage means is less than or equal to the setting temperature, the central air conditioner will stop operation.

2. A controlled method for an energy-saving and energy-releasing refrigerating air conditioner wherein a refrigerating requirement is less than or equal to a setting refrigerating temperature during circulation, and wherein a heat-produced temperature is less than a setting heating-produced temperature, an energy-saving and energy-releasing refrigerating air conditioning system forces performing heating-produced circulation, which the method comprising the steps of:

(1) in cases where a first refrigerant back-flow temperature is less than a first setting temperature, and where a second refrigerant back-flow temperature is less than a second setting temperature, the refrigerating air conditioning system automatically chooses a first refrigerant circular loop as circulation, and first refrigerant flow controllers are all opened, and a refrigerant flow rate is at maximum flow rate, a flow of the second refrigerant flow controller is at a minimum flow rate, and a storage means is performing a heat-releasing action;

(2) in the cases where the first refrigerant back-flow temperature is less than or equal to the first setting temperature with adding setting temperature range, and where the first refrigerant back-flow temperature is greater than or equal to the first setting temperature, the first and the second refrigerant circular loops are acting at the same time, and the refrigerant flow rate of the first refrigerant flow controller is an inverse ratio to the first refrigerant back-flow temperature, and while the first refrigerant back-flow temperature is greater, the refrigerant flow rate of the first refrigerant flow controller is small, and as a result, the refrigerant flow rate is automatically adjusted and the refrigerant flow rate of the second refrigerant flow controller is increased, the storage means will perform, a heat-saving action and the heat-releasing action, and makes the heat-releasing action into the heat-saving action;

(3) in the cases where the first refrigerant back-flow temperature is greater than the first setting temperature with adding setting temperature range, and where the second refrigerant back-flow temperature is greater than or equal to the second setting temperature, the refrigerating air conditioning system automatically makes heating-releasing action to the heating-saving action and automatically chooses the second refrigerant circular loop as circulation, and the flow of the first refrigerant flow controllers in the means time is at minimum flow rate, the flow of the second refrigerant flow controller is at a maximum flow rate, and the storage means is performing the heat-saving action; and (4) while the temperature of storage means is greater than or equal to the setting temperature, the central air conditioner will stop operation and complete the energy-saving operation.

* * * * *